United States Patent [19]

Schray et al.

[11] 4,431,953
[45] Feb. 14, 1984

[54] CIRCUIT FOR OPERATING A SYNCHRONOUS MOTOR FROM A DC SUPPLY

[75] Inventors: Hans-Dieter Schray, Markgröningen; Bernd Taubitz, Schwieberdingen; Rainer Wirtz, Markgröningen, all of Fed. Rep. of Germany

[73] Assignee: Robert Bosch GmbH, Stuttgart, Fed. Rep. of Germany

[21] Appl. No.: 297,861

[22] Filed: Aug. 31, 1981

[30] Foreign Application Priority Data

Nov. 13, 1980 [DE] Fed. Rep. of Germany ....... 3042819

[51] Int. Cl.³ .............................................. H02K 29/00
[52] U.S. Cl. ................................... 318/254; 318/138; 318/439
[58] Field of Search ................. 318/138, 254, 439, 722

[56] References Cited

U.S. PATENT DOCUMENTS

| 4,162,435 | 7/1979 | Wright ............................ 318/138 |
| 4,172,990 | 10/1979 | Everett et al. ................... 318/254 |
| 4,262,237 | 4/1981 | Gelenius ........................... 318/254 |

Primary Examiner—J. V. Truhe
Assistant Examiner—Saul M. Bergmann
Attorney, Agent, or Firm—Frishauf, Holtz, Goodman & Woodward

[57] ABSTRACT

Commutation of the stator windings of a synchronous motor energized by a d.c. supply is controlled by comparison of voltages induced in two stator windings neither of which is a winding previously energized nor a winding about be energized. For speed control, turning on of the winding next energized can be delayed controllably. Motor current during start-up or overload can be limited by chopping, with a variable keying ratio, the d.c. supply connection to the motor during the first 80% of the period of energization of each stator winding. For reducing delay in starting, the rotor may be brought into a particular position automatically every time the motor is stopped or, in the case of a fuel pump motor for an injection type internal combustion engine, just before starting the engine through a supplementary contact controlled by the ignition key. Starting up can be provided by two initial pulses of commutation provided by means of an oscillator and two transistors.

6 Claims, 17 Drawing Figures

CIRCUIT FOR OPERATING A SYNCHRONOUS MOTOR FROM A DC SUPPLY

This invention concerns an electronic commutation circuit for operating a synchronous motor controllably from a dc supply. The synchronous motor so operated has stator windings to which the dc voltage is switched in cyclic sequence.

Synchronous motors are commonly operated from an alternating current supply in which a multi-phase set of field windings generates a rotary field which is followed by the rotary movement of the pole system of the rotor of the motor, which is constituted either as a permanent magnet system or is energized by windings to which direct current is fed over slip rings.

If a dc power distribution system is available for supplying energy to a synchronous motor, it is known to provide arrangements for switching the stator winding of the synchronous motor cyclically to the dc voltage. For example, a transformerless rotary field generator energizable with direct current is disclosed in publication "Intermetall, 100 typische Schaltungen mit Halbleiterbauelementen," example number 30 (Freiburg, Germany, 1967). That system is described in the form in which it can be installed for operating synchronous motors when the speeds of individual drives at separate locations are required to be exactly the same and also variable all together. This arrangement makes possible the provision of a so-called "electrical shaft." It is similarly possible to provide also "electrical gears" by electronically dividing the frequency at which a first transformerless ac generator is driven in order to drive a second generator. In this way drives with a fixed speed ratio are obtainable.

The known circuit arrangement, however, provides no means for autonomously stepping ahead the stator windings of the synchronous motor. Furthermore, the problems of starting up the motors, limiting the current and regulating the speed are not taken into account.

SUMMARY OF THE INVENTION

It is the object of the present invention to provide a circuit for operating a synchronous motor from a dc supply in which the stator windings are autonomously switched with reference to the position of the rotor, so that the synchronous motor as a whole behaves as a steadily excited dc motor.

Briefly, the alternating voltages induced in the stator windings not at the time connected to the dc supply are measured and connection of a particular stator winding to the d.c. supply is made during a prescribed electrical angle range at least approximately symmetrically disposed with respect to the peak value of the negative half-wave induced in the particular stator winding. This electrical angle range for a synchronous motor n-phase operation is typically 360°/n. The moments for switching on and off a particular stator winding are determined according to the invention by comparison of voltages induced in respective unconnected stator windings and the rule for these comparisons can be stated in a simple formula set forth in the description given below.

The use of an angle range of 360°/n causes the synchronous motor to deliver its maximum torque and to operate at highest efficiency.

The use of a ring counter for cyclically switching the stator windings, with a clamp circuit at the counting input, is helpful for excluding the effect of disturbing signals, such as switching transients, which might otherwise interfere with the progressive switching of the ring counter. There are also preferred circuits including means for limiting the current in starting up, means for speed regulation of the motor and means for quick starting.

BRIEF DESCRIPTION OF THE DRAWINGS

The invention is further described by way of illustrative example with reference to the annexed drawings, in which.

DESCRIPTION OF THE ILLUSTRATED EMBODIMENTS

Figure 1:
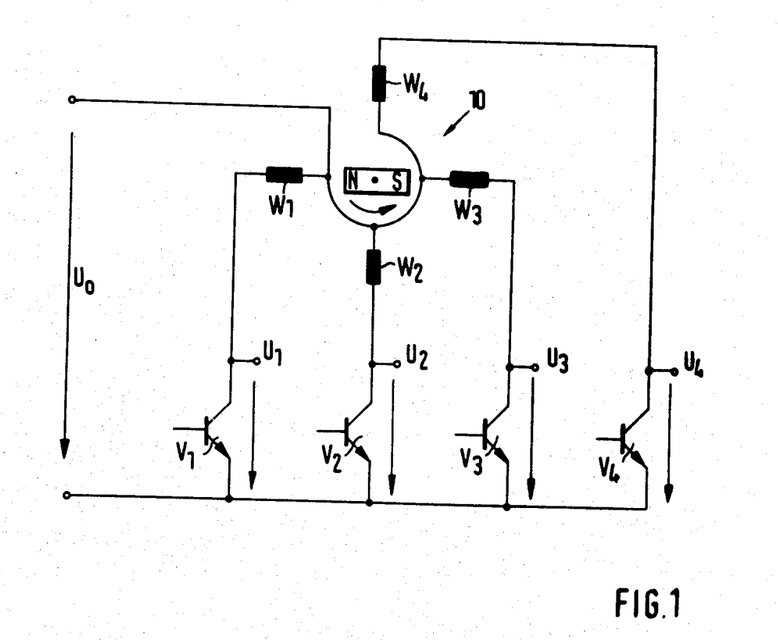
FIG. 1 is a basic diagram of the principles of operation of a synchronous motor by means of controlled switching elements in the leads of the respective stator windings.

In the diagram of a circuit for operating a synchronous motor from a dc source given in FIG. 1 the synchronous motor 10 has stator windings $W_1$, $W_2$, $W_3$ and $W_4$ in star connection. The central star point is connected to one terminal of the d.c. voltage supply $U_o$. The other ends of the stator windings $W_1$, $W_2$, $W_3$ and $W_4$ are connected through electrically controlled switches (which may be referred as electric valves) $V_1$, $V_2$, $V_3$ and $V_4$ to the other terminal of the dc voltage supply $U_o$ through a bus connection. The electrical switches $V_1$, $V_2$, $V_3$ and $V_4$ are shown in FIG. 1 as transistors across the respective middle-collector paths of which appear the control voltages $U_1$, $U_2$, $U_3$ and $U_4$. It is to be understood that other electrical or electronic switching elements can be used instead of transistors for switching on and off the current for the stator windings.

The rotor of the synchronous motor 10 in the illustrated case is of the permanent magnet type having north and south poles respectively designated N and S.

By cyclically turning on the switches $V_1$, $V_2$, $V_3$ and $V_4$ the stator windings $W_1$, $W_2$, $W_3$ and $W_4$ can sequentially be connected to and disconnected from the dc supply $U_o$. In accordance with the circuit of the invention at any time only one winding is energized and the others are disconnected and the autonomous operation of the switches $V_1$, $V_2$, $V_3$ and $V_4$ is carried out as a function of the voltages produced by comparing differences between the dc supply voltage and the alternating current voltages induced in the stator windings which are obtainable as $U_1$, $U_2$, $U_3$ and $U_4$ in the windings that are not at the moment being fed with current from the dc supply.

Figure 2:
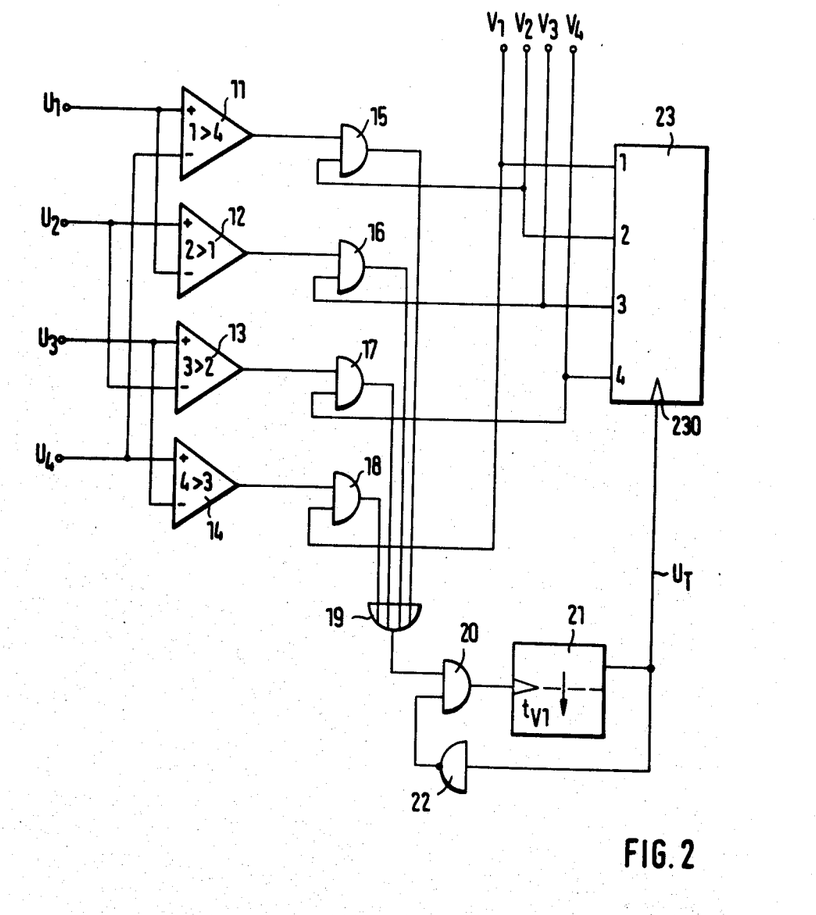
FIG. 2 is a diagram of an electronic circuit for autonomously switching the stator windings cyclically.

An embodiment of a circuit according to the invention for cyclically commutating the stator windings $W_1$, $W_2$, $W_3$ and $W_4$ is illustrated in FIG. 2. The voltages $U_1$, $U_2$, $U_3$ and $U_4$ available in the circuit of FIG. 1 are applied to the circuit of FIG. 2 through the corresponding terminals at the left of the drawing. The outputs of the circuit of FIG. 2 shown at the upper right are the control signals $V_1$, $V_2$, $V_3$ and $V_4$. The voltages $U_1$, $U_2$, $U_3$ and $U_4$ are applied to the respective positive inputs of the comparator 11, 12, 13 and 14, the negative inputs of which are connected to the respective positive inputs of certain other comparators in such a way that in the first comparator 11 the voltage $U_1$ is compared with the voltage $U_4$, in the second comparator 12 the voltage $U_2$ with the voltage $U_1$, in the third comparator the voltage $U_3$ with the voltage $U_2$, and in the fourth comparator 14 the voltage $U_4$ with the voltage $U_3$. The outputs of the comparators 11, 12, 13 and 14 are connected to the respective first inputs of AND-gates 15, 16, 17 and 18, of which the other inputs are connected to the output terminals where the control voltages for the switches $V_1$, $V_2$, $V_3$ and $V_4$ are available. The first AND-gate 15 is connected with the output line for controlling $V_2$, the second AND-gate 16 with that for $V_3$, the third AND-gate 17 with that for $V_4$ and a fourth AND-gate 18 with that for $V_1$. The outputs of the AND-gates 15, 16, 17 and 18 are connected to a quadruple OR-gate 19, the output of which is connected with one input of AND-gate 20. The output of the AND-gate 20 is connected with the dynamic set input of a monostable flipflop 21 that has the dwell time $t_{V1}$.

The non-inverting output of the monostable flipflop 21 is on the one hand connected through an inverter 22 with the second input of the AND-gate 20 and on the other hand to the dynamic count input 230 of a counter 23. The counter 23 has four count conditions because the number of phases n is four for the synchronous motor 10 illustrated in FIG. 1. Each count condition 1 to 4 produces a signal on one of the count outputs 1 to 4, with the output line 1 being connected to the control input for the switch $V_1$, the output line 2 with that for the switch $V_2$, the output line 3 with that for the switch $V_3$, and the output line 4 with that for the switch $V_4$. With each turning on of the input 230, the counter is advanced by one place in the sequence 1-2-3-4-1 and the turning on of the switches thereby proceeds autonomously in the same sequence.

The manner of operation of the circuit of FIG. 2 can be more readily understood by reference to the diagrams given in FIGS. 3A-3H on a common time scale. 3A shows the voltages $U_1$, $U_2$, $U_3$ and $U_4$ that are respectively induced in the stator windings $W_1$, $W_2$, $W_3$, $W_4$ when the particular winding is not connected for energization by the dc source. In order to utilize the maximum torque and the highest efficiency of the synchronous motor, each winding is switched so as to be energized for a period corresponding to an angle of 90° (in the case of a four-phase motor) disposed symmetrically to the peak of the negative half-wave of the induced alternating current i.e. the minimum of the respective voltages $U_1$, $U_2$, $U_3$ and $U_4$. From FIG. 3A it accordingly follows directly that the beginning of energization of the stator winding $W_1$, for example, occurs at the moment at which the voltage $U_3$ becomes greater than $U_2$. The dc supply is correspondingly to be switched from the first winding $W_1$ to the second winding $W_2$ when the voltage $U_4$ becomes greater than $U_3$.

Figures 3A, 3B:
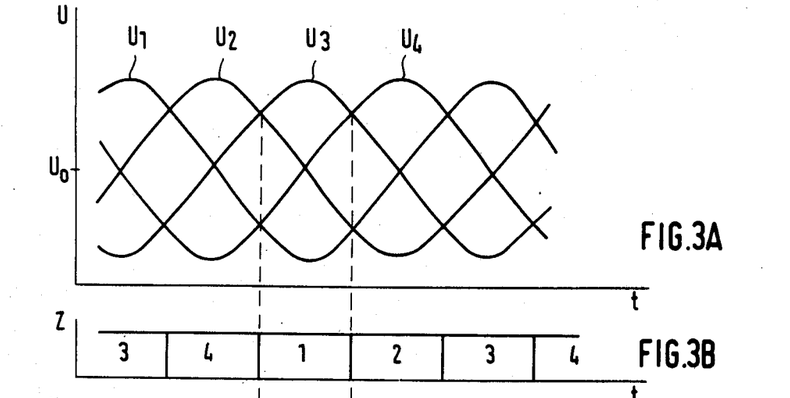
FIGS. 3A, 3B, 3C, 3D, 3E, 3F, 3G, and 3H are timing diagrams on a common time scale illustrating the course and relation of various signals in the circuits of FIG. 2.

The sequence of operations is plain in reference to FIG. 3B which plots the state of the counter 23 with respect to time. As shown by these time diagrams, the control signal for switching on the winding $W_1$ during the commutation interval above-mentioned is connected with the counter-condition "1". When the voltage $U_4$ becomes greater than $U_3$, the counter goes into the state 2, while according to the circuit of FIG. 2 the switch $V_2$ is closed.

The progressive stepping of the counter 23 is, as already mentioned, produced by signals applied to the input 230 of the counter by the monostable flipflop 21. For this purpose, the switchover conditions corresponding to the appropriate comparison on the voltages $U_1$, $U_2$, $U_3$ and $U_4$ are determined in the comparators 11, 12, 13 and 14. When a commutation moment is reached, for example when $U_3$ becomes greater than $U_2$, a control signal at the output of the comparator 13 is provided to the AND-gate 17. The AND-gate 17 introduces a signal if at the same time the count condition 4 is written into the counter 23, which, as shown in FIG. 3B, is the case for a period preceding the moment when the commutation condition $U_3 > U_4$ is reached.

By supplying the counter output signals to the respective AND-gates 15, 16, 17 and 18 a preparation of these AND-gates is obtained such that a signal for stepping the counter 23 through these AND-gates will be produced only when there is the proper combination of a particular state of the counter 23 and the corresponding commutation condition determined from comparison among the voltages $U_1$, $U_2$, $U_3$ and $U_4$.

Figure 3C:
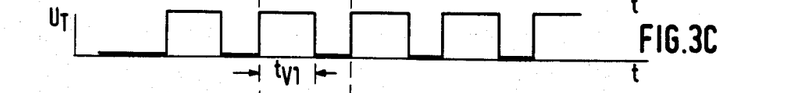
Figures 3D, 3E:
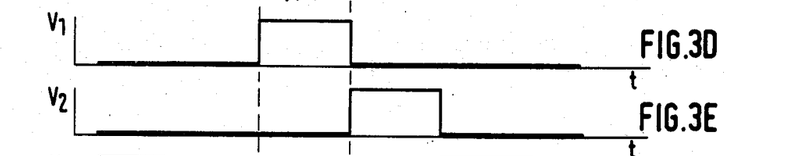

Each of the output signals of the AND-gates 15, 16, 17 and 18 controls through the OR-gate 19, one input of the AND-gate 20 that in turn acts on the monostable flipflop 21. When the connection of the non-inverting output of the monostable flipflop through the inverter 22 with the other input of the AND-gate 20 serves the purpose of holding a positive signal at the input 230 of the counter 23 during the dwell time of the monostable flipflop 21 as shown in FIG. 3C. This has the effect of preventing any disturbing voltages produced in commutation of the windings from leading to an unintended further stepping of the counter 23 prior to next defined commutation condition. FIG. 3C represents the output voltage at the non-inverting output of monostable flipflop 21, of which the dwell time is designated $t_{v1}$. This dwell time is of such magnitude that all impulses and oscillations following the commutation of the stator winding have died away during the dwell time, after which the monostable flipflop 21, and with it the counter 23, are then unlocked for the next commutation step. By reducing exposure to after effects of switching transients, it becomes possible to use highly sensitive comparators without risk of unreliability in their operation.

FIGS. 3D, 3E, 3F, and 3G show the controls signals respectively applied to the electronic switches $V_1$, $V_2$, $V_3$, and $V_4$. In the above-mentioned example, in which commutation switches to the stator winding $W_1$ when $U_3$ becomes greater than $U_2$, this means that until the next commutation condition ($U_4$ greater than $U_3$) the switch $V_1$ remains switched on. Thereafter commutation proceeds to $V_2$ and then to $V_3$ and so on.

Figures 3F, 3G, 3H:
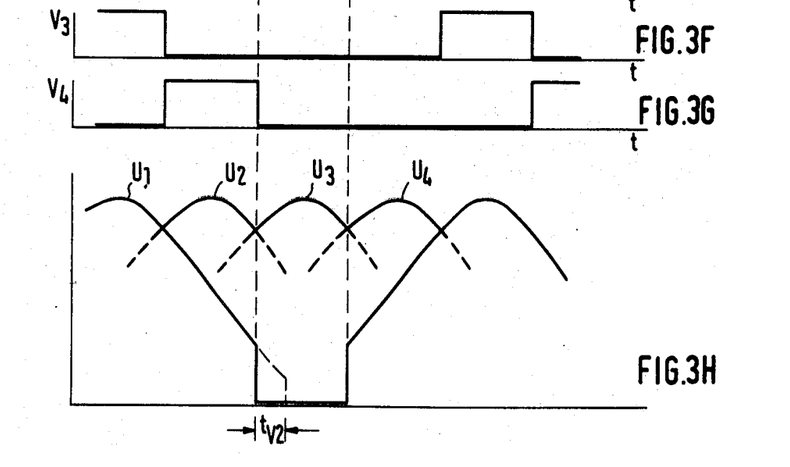

In FIG. 3H there is finally shown the voltage $U_1$ for the stator winding $W_1$ representing, in contrast to FIG. 3a, the circumstances when the switching on and off of the stator windings that takes place is taken into account. This signifies that at the switching-on moment of the stator winding $W_1$ the voltage $U_1$ sinks to zero because of the turning on of the switch $V_1$, until the supply voltage is then commutated further to the stator winding $W_2$. As pointed out further below, in an advantageous embodiment of the circuit of the invention it is possible to delay the switch-on moment for the individual windings (shown for the illustrated example for the stator winding $W_1$) a predetermined amount $t_{V2}$, in order to provide in this manner for speed control of the synchronous motor. In the case of the synchronous motor operated in accordance with the invention a counter e.m.f. growing with increasing speed builds up as in the case of a dc motor, so that the current correspondingly decreases. If now the switching elements for the current are to be designed for the lower current at higher speeds, it is necessary to limit the current in the start up operation of the motor. In other words, current limiting in start-up is necessary to obtain both good start-up conditions and high efficiency at high speeds.

Figure 4:
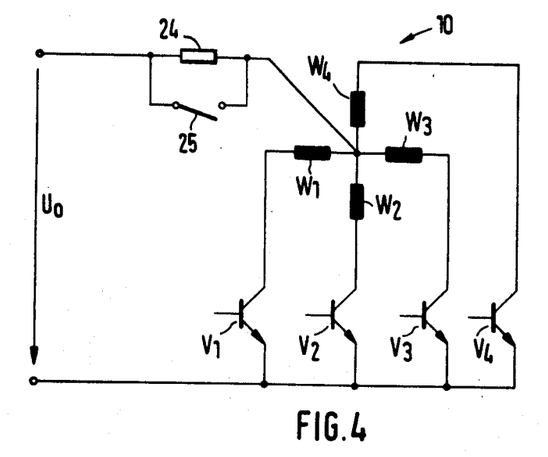
FIGS. 4, 5, and 6 are several embodiments of circuits for limiting the starting current of the synchronous motor.

In a first modification of the circuits of the invention, illustrated in FIG. 4, a series resistance 24 in the lead to the star point of the stator windings ($W_1$, $W_2$, $W_3$, $W_4$) is interposed. The resistance 24 is arranged to be cut out by an electromechanical or electronic switch 25 in accordance either with the level of current or the motor speed by means not shown.

Figure 5:
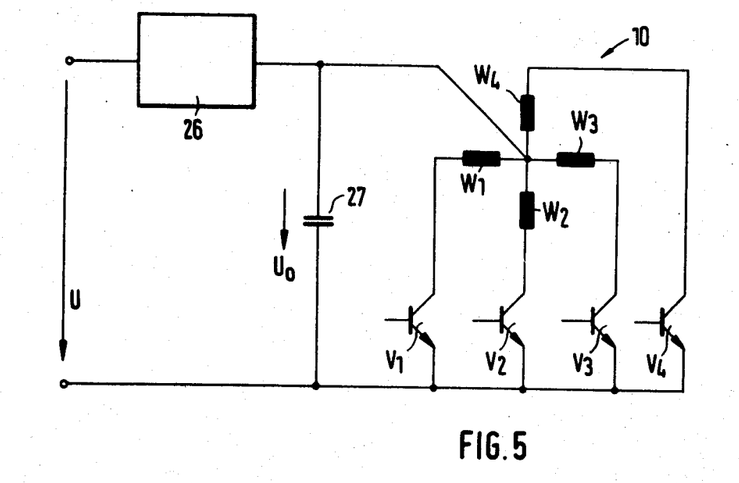

In a further modification of the invention, shown in FIG. 5, the synchronous motor 10 is connected to the tap of a voltage divider composed of a series element 26 and a capacitor 27. By the adjustable series element 26, for example a series transistor, the voltage $U_o$ is limited and thereby likewise the motor current. The capcitor 27 serves in this embodiment to take care of smoothing out the sharp pulses occurring in the free-run or "reverse kick" part of the switching cycle of a winding and thereby provides on the whole an improvement of the efficiency of the synchronous motor.

Figure 6:
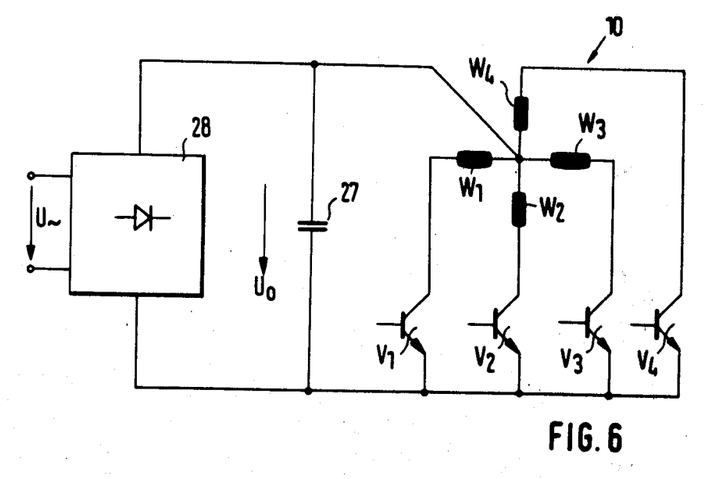

In FIG. 6 is finally shown an embodiment of the invention in which the d.c. voltage for energizing the synchronous motor 10 is obtained from an alternating voltage $U\sim$, with provision by means of a controllable rectifier 28 for adjustment of the d.c. supply voltage $U_o$ applied to the capacitor 17.

Figure 7:
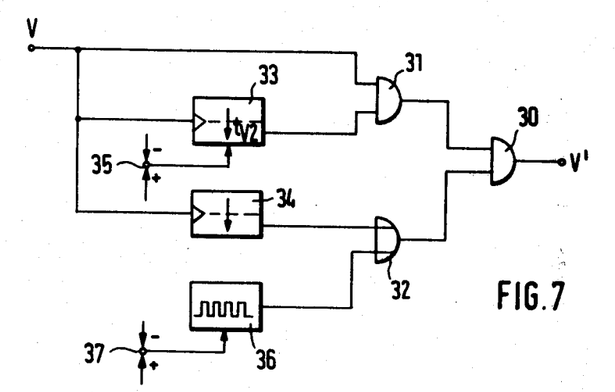
FIG. 7 is a diagram of a circuit for both limiting the current and regulating the speed of the synchronous motor.

Limiting of the start-up current can be obtained by intermittently chopping the closure of the controlled switches $V_1$, $V_2$, $V_3$ and $V_4$ thereby limiting the maximum value or the average value of the current. If that is done continuously, however, as a result of the chopping a reliable comparison among the voltages $U_1$, $U_2$, $U_3$, $U_4$ is no longer possible. For this reason, shortly before an expected intersection of the critical voltage values the chopping must be stopped. In FIG. 7 a circuit is shown in which not only is the start-up current limited by chopping, but also the speed of the synchronous motor 10 is adjusted or set by a variable switch-on delay.

For this purpose the control signal V for a switch is first converted into a modified control signal V. The control signal V is available at the output of an AND-gate 30 that has one input connected to the output of and AND-gate 31 and the other input connected to an OR-gate 32. The AND-gate 31 has one input connected to the steady control signal input V and the other input connected to the inverting output of a monostable flipflop 33 that has a dwell time $t_{V2}$ which is responsive to the difference between a desired speed $n_d$ and an actual speed $n_a$, as indicated by the summing point 35. The OR-gate 32 is connected by one input to the inverting output of monostable flipflop 34 which responds to the steady control signal V and another input connected to a chopping wave generator 36 that is controllable by the difference between a maximum current $i_{max}$ and the actual current $i_a$, as indicated by the summing point 37, which like summing point 35 may be constituted by the output of a comparator. The control provided at the summing point 37, for example, vary the keying ratio of a square wave.

In order to obtain current limiting in the above described manner, the difference between the actual current $i_a$ and the maximum current $i_{max}$ is first formed at the summing point 37 and the chopping wave generator 36 is controlled in accordance with that difference. The control signal V, such as would be produced by one of the outputs of the circuit of FIG. 2, for example, sets the monostable flipflop 34 for a predetermined time which for example corresponds to 80% of the switch-on time of a winding. Then, through the connection of the output signals of the elements 34 and 36 in the OR-gate 32 it is provided that after the lapse of the dwell time of the monostable flipflop 34 the OR-gate will in any case operate i.e. the chopping wave generator will be effective only during a first part of a switch-on time of each winding. There follows thereafter a quiescent period in which the transients caused by chopping die away so that the ring-counter 23 will be prepared for the next commutation.

In order to adjust the speed of the synchronous motor 10 it is on the one hand possible so to adjust either the series element 26 of FIG. 5 or the controllable rectifier 28 of FIG. 6 so that the voltage $U_o$ is changed until the desired speed is reached. On the other hand it is also possible to provide speed regulation by pulse length control. For this purpose the summing point 35 of FIG. 7 the difference between the actual speed $n_a$ and the desired speed $n_d$ is formed and in response thereto the dwell time is fixed for the monostable flipflop 33. As already mentioned above, its dwell time $t_{V2}$ is related to the difference between desired and actual speed. So long as the monostable flipflop 33 is in its set condition, the control signal V is not transmitted through the AND-gate 31 and the AND-gate 30 to provide the modified control signal $V^1$. As already described in the description of FIG. 3H, this delay of the control signal V produces a change in the course of the voltage of, for example $U_1$, in the manner shown in FIG. 3H in broken lines. The effective switch-on time of the stator winding $W_1$ in this example is thereby shortened and the motor speed thereby reduced. In the embodiment shown in FIG. 7 the speed of the synchronous motor 10 is thus regulated by the comparison of desired and actual speed. It is of course also possible to provide, instead of a speed regulation, a control of the synchronous motor 10 by feeding in a control signal at the summing point 35.

Since in the rest condition the synchronous motor for operation according to the invention has no information regarding the position of its rotor, a special control is necessary for starting up. For this purpose either first a rotating field of very low frequency, preferably rising slightly with time, is produced and then the motor is switched over into the autonomous commutation described above in detail. The switching over can take place either at a particular speed or in response to switching means which recognize when the induced voltages $U_1$, $U_2$, $U_3$ and $U_4$ make possible recognition of the rotor position. In a further and preferred embodiment of the invention the start-up control is performed by bringing the rotor before start-up to a defined position by continued turning on of one of the switches $V_1-V_4$ and then that switch is shut off while at the same time the next switch in the cyclic sequence is turned on. With a corresponding design of the comparators 11, 12, 13 and 14 this has the result that the after next switch already operates by autonomous commutation.

The above described indirect indication of pole wheel position depends upon the comparison of the electrodynamically induced voltages in the windings then not conducting current. For example the switch $V_1$ conducts until $U_4 > U_3$, then $V_1$ blocks and $V_2$ becomes conducting until $U_1 > U_4$, and so on. This recognition of the pole wheel position by comparison of the phase voltages requires no supplementary construction in the motor. It already functions at very low speeds of rotation, but still not in the rest condition. It is for this reason that special provisions are needed for the start.

As above proposed, at the start the counter can be stepped forth by pulses provided by an auxiliary pulser in very slow steps (0.5 sec) so that the rotor can orient itself reliably. As soon as direction of rotation, counter condition and voltage wave intersection points fit together, the motor goes into autonomous control and accelerates with maximum torque up to the operating speed. In the most unfavorable case there is a starting delay in this arrangement of more than one second.

For particular applications this starting delay is intolerable (e.g. in the fuel pumps of fuel-injected motors which, as is common knowledge, need to start extremely quickly and put a pulsating load on the electric motor that drives the pump, thus making rapid starting more difficult). An undelayed start can be obtained according to the invention by causing the rotor to be brought into a defined position upon stopping of the motor, from which position a new start can take place without delay.

Each start operation requires a particular position of the pole wheel and begins with the counter set in a particular state. A stator winding is connected to the supply voltage through the corresponding (transistor) switch (for example $V_1$, for the case of the further steps given in this example). If within a certain time $U_4$ becomes greater than $U_3$, $V_1$ is blocked and $V_2$ becomes conducting. The motor then runs autonomously, as a rule from the very first step. If a certain time lapse is exceeded before $U_4 > U_3$ (stopping because of unsuitable initial position of the pole wheel), or if immediately after the intersection $U_4 > U_3$ there is also $U_1 > U_4$ (reverse rotation because of unsuitable initial position of the pole wheel), the start is interrupted and a positioning procedure is instituted. In the positioning the switches $V_3$ and $V_4$ are made conducting in succession for about 0.5 seconds. The pole wheel is thereby so oriented that thereafter, with the counter state 1 the start can take place in autonomous operation.

For preparation of the quick start, after every stopping of the motor (e.g. stopping of the fuel pump, if an internal combustion engine is shut off by means of the ignition key) the positioning is carried out according to the invention in a post-operation "overrun" program and thereafter the equipment is switched off.

A new start then is produced as a rule without starting delay.

If the after-positioning is spoiled by any circumstance whatever and the quick start does not operate, the supplementary positioning procedure is automatically initiated.

In a further development of the invention the positioning operation is initiated before the actual start by a supplementary signal provided through the ignition key, e.g. seat or door contact.

Figure 8:
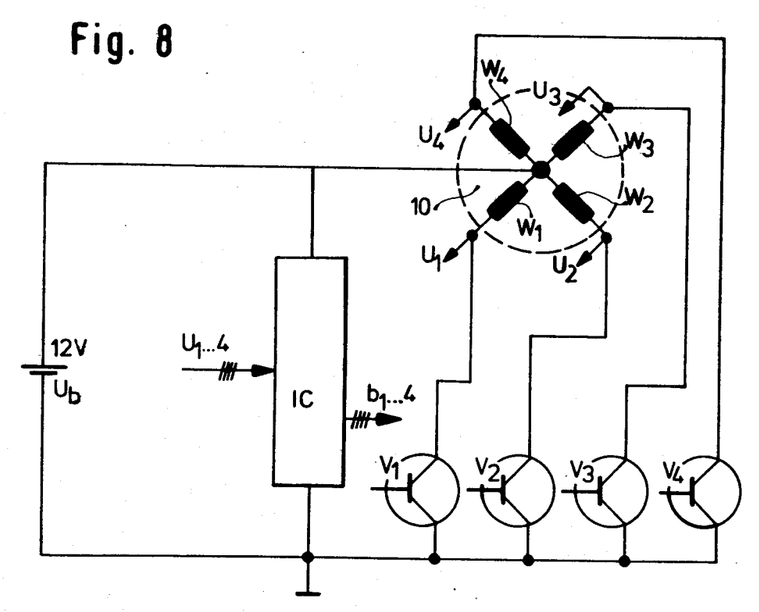
FIGS. 8 and 9 are diagrams of motor control circuits having improved starting behavior.
Figure 9:
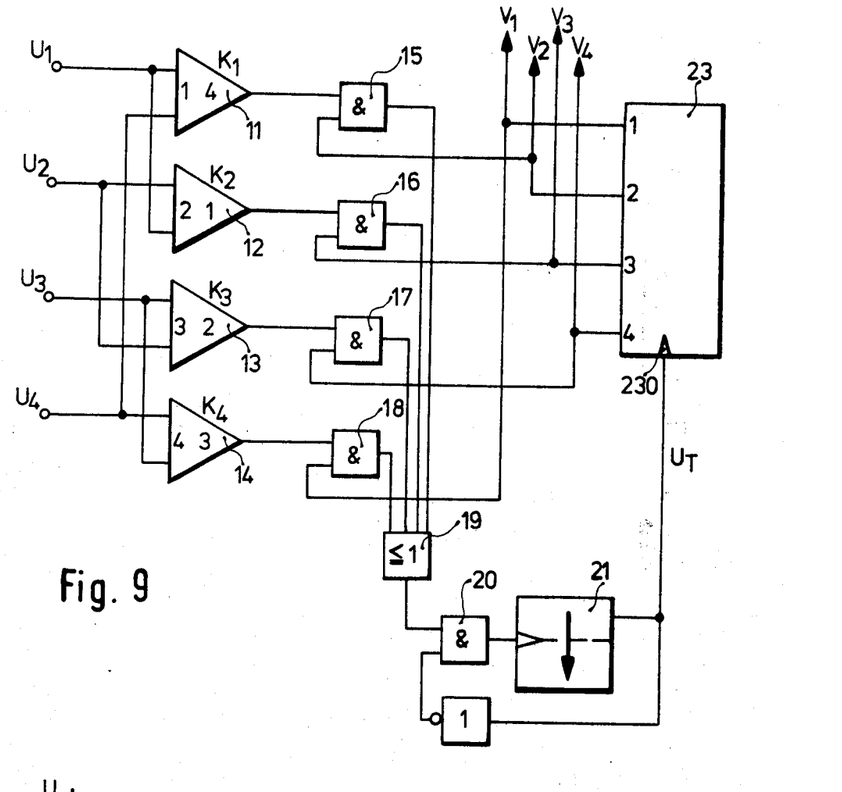
Figure 10:
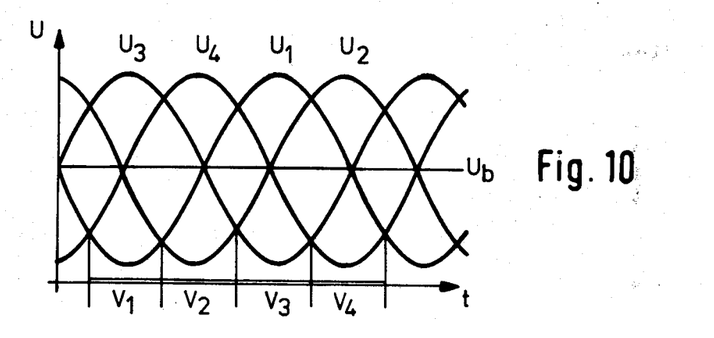
FIG. 10 is a wave-time diagram illustrating timing of the switching of the various windings.

FIG. 8 illustrates symbolically the control of the switches $V_1$, $V_2$, $V_3$ and $V_4$ by a microprocessor integrated circuit IC to which the voltages $U_1$, $U_2$, $U_3$ and $U_4$ are supplied as input and the necessary control signals for the switches designated $V_1$, $V_2$, $V_3$ and $V_4$ are provided from IC outputs to the control terminals of the respective switches. By appropriate programming, all of the above described functions can be performed, since the necessary and sufficient conditions are provided by the $U_1-U_4$ inputs. Provision for switching off the control circuit of the motor some time after the motor is stopped as a result of turning off an automobile's ignition key is not shown, but its incorporation in FIG. 8 can readily be made.

We claim:

1. Circuit for operating, from a d.c. supply of electric voltage, a synchronous electric motor having a stator equipped with a plurality of phase windings, n in number, and a pole-wheel rotor, by cyclically connecting said windings to said d.c. voltage supply, comprising means, responsive to voltage induced in said windings while said windings are not connected to said d.c. voltage supply, for connecting each of said windings in a predetermined sequence to said d.c. voltage supply over an angular interval which is substantially 360°/n of the voltage wave induced in the winding, said interval being substantially centered on the extreme value of the voltage of the negative half of said voltage wave in the particular winding, said connecting means being arranged to connect each of said windings thereto in response to comparison of the voltages induced in two others of said windings and comprising for that purpose:

means ($V_1$, $V_2$, $V_3$, $V_4$) for switching each of said windings individually into and out of connection with said d.c. voltage supply in response to control signals;

means (11, 12, 13, 14) for comparing the voltage at corresponding terminals of each pair of windings that succeed each other in the energization sequence for switching on a winding other than those of which the voltage is being compared, which is approaching an induced voltage extreme value of the polarity opposite to that of the induced voltage component of the compared voltages and for simultaneously switching off the winding which was the last previous one in sequence to have been switched on, the number of said phase windings being sufficiently large and said comparing means being constituted so that said last previous winding in sequence to have been switched on is never one of said pair of windings of which the voltage is being compared;

means (15-23) including a cyclic counter (23), for recognizing, during operation of said motor, said pair of windings for each comparison operation of said comparing means and for processing the output of said comparing means to provide control signals for said switching means ($V_1$, $V_2$, $V_3$, $V_4$), and means for blocking the advance of said cyclic counter (23) for a predetermined time after every advance operation thereof.

2. Circuit as defined in claim 1 in which means are provided for varying the interval between the beginning and end of the d.c. supply connections during said 360°/n angular intervals to the respective stator windings in response to the difference between a reference speed and the actual speed of said synchronous motor.

3. Circuit as defined in claim 2 in which said means for varying said d.c. supply connection interval of said stator windings is constituted by means for producing a variable delay of the switch-on times of the respective stator windings.

4. Circuit as defined in claim 1 in which means are provided for controlling the current of said synchronous motor by interposing a controllable intermittent chopping stage in the d.c. supply connection to said synchronous motor, and in which means are also provided for controlling the keying ratio of said chopping stage in response to the comparison between the maximum permissible motor current ($i_{max}$) and the actual motor current ($i_a$).

5. Apparatus as defined in claim 4 in which said chopping stage is activated only during a first portion of the d.c. supply connection period of each of said stator windings.

6. Circuit as defined in claim 5 in which said first portion of the d.c. supply connection period of each of said stator windings during which said chopping stage is operative extends substantially for 80% of said d.c. supply connection period.

* * * * *